UNITED STATES PATENT OFFICE.

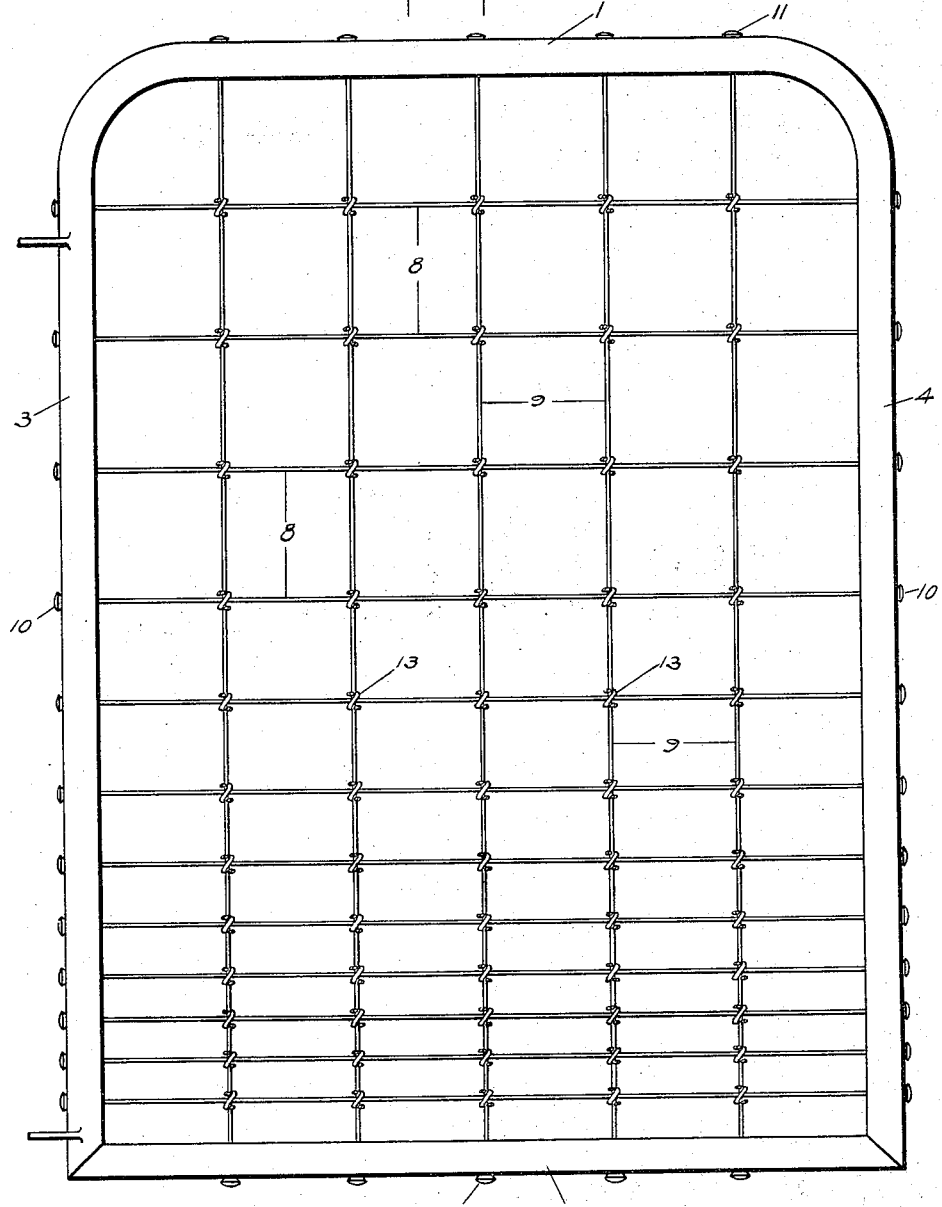

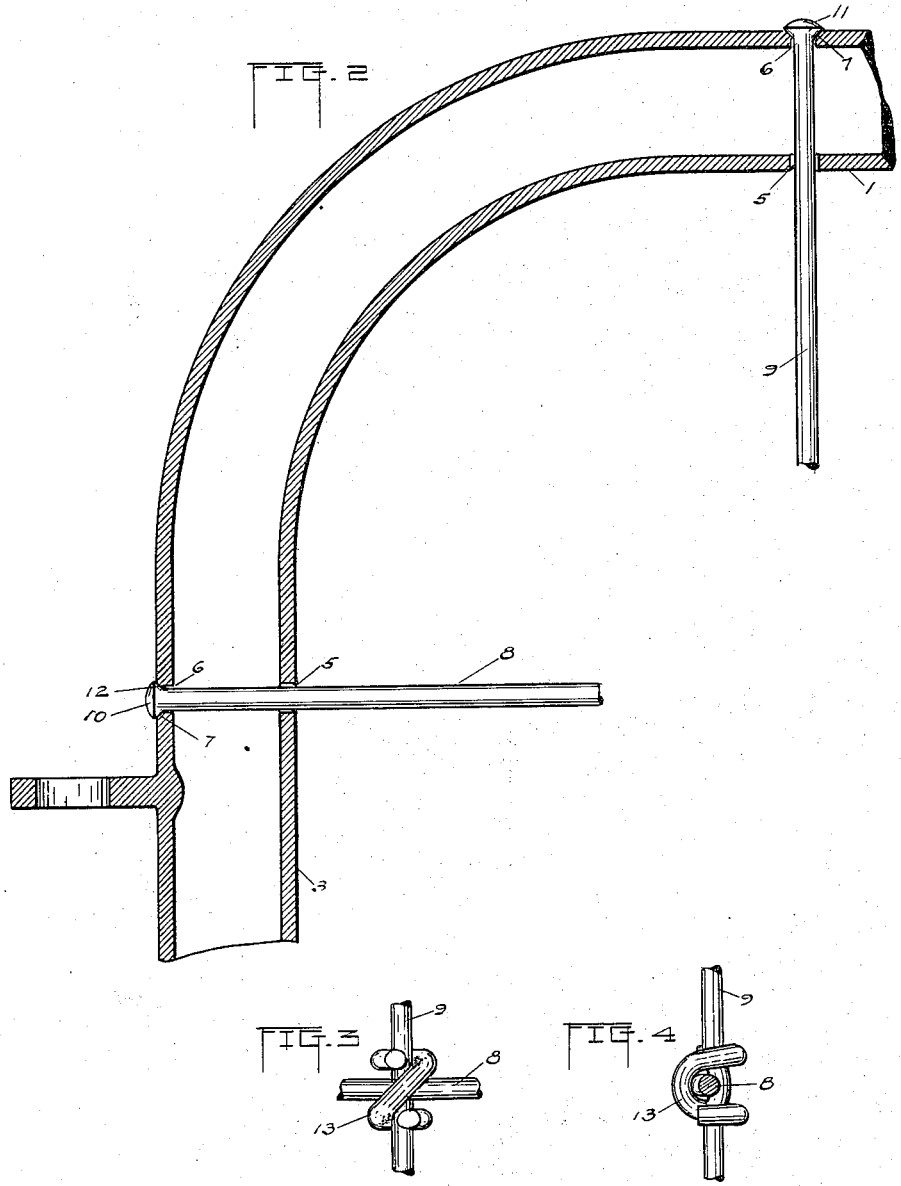

WILLIAM H. SOMMER, OF PEORIA, ILLINOIS.

WIRE GATE.

1,157,054.   Specification of Letters Patent.   Patented Oct. 19, 1915.

Application filed December 10, 1913. Serial No. 805,848.

*To all whom it may concern:*

Be it known that I, WILLIAM H. SOMMER, a citizen of the United States, residing at Peoria, in the county of Peoria and State of Illinois, have invented new and useful Improvements in Wire Gates, of which the following is a specification.

This invention has reference to certain new and useful improvements in wire gates, particularly of that type of gate intended to be used as a walk, drive-way or farm gate.

The object which I have in view in the present invention is to improve upon the character of wire filler used in gates of the character referred to; in the manner of securing the ends of the line wires to the end bars of the frame and the ends of the mesh forming wire or picket wires to the top and bottom bars of the frame; whereby, they may be held taut in the frame, and in the manner of securing the mesh forming wires, such as the picket wires, to the line wires, so that lateral pressure or sudden strain upon the body of the fabric will have no injurious effect thereon or cause such wire filling to sag or become loose, but on the contrary will retain its taut appearance in the frame.

In the drawings: Figure 1 shows in elevation a gate embodying my invention; Fig. 2 is a sectional detail showing the fastening of the ends of either the line wires, mesh forming wires or picket wires in the frame, and Figs. 3 and 4 show in detail the fastening of the mesh forming wires, such as the picket wires, to the line wires, where they intersect.

Like characters of references denote corresponding parts throughout the figures.

The gate frame shown in the drawings may be of any suitable width or height, but I prefer to construct the frame from steel tubing, including the top and bottom bars 1 and 2 and the opposite end bars 3 and 4. The end bars 3 and 4 and the top and bottom bars 1 and 2 are each provided with a plurality of pairs or sets of perforations or openings 5 and 6. The form and arrangement of the perforations or openings are best seen in Fig. 2. The pairs or sets of perforations 5 and 6 in the end bars 3 and 4 may be spaced throughout the length of such bars in any suitable manner, either equidistant from each other or at graduated distances apart. If equidistant from each other, they will receive line wires which are spaced at uniform distances apart, but if said pairs or sets of perforations or openings are spaced at graduated distances apart, they will receive line wires which are similarly spaced. The pairs or sets of perforations or openings 5 and 6 in the top and bottom bars 1 and 2 of the frame will be preferably spaced at uniform distances apart as the mesh forming wires, such as the picket wires will be uniformly spaced. The perforations or openings 5 and 6 for both the line wires and mesh forming or picket wires being the same, the description of one set or pair of openings will suffice for all.

The perforations or openings 5 in the top, bottom and end bars are much larger in size than the perforations or openings 6, for purposes which will be explained, and said perforations or openings 5 are preferably upon what may be termed the inside faces of the said top, bottom and end bars and diametrically opposite the perforations or openings 6 which are upon the outside of such bars. The perforations 6 where they open out of the top, bottom and end bars are cup shaped or are formed with the concave seat 7, also best seen in Fig. 2, for a purpose which will be further explained.

The wire filling for the frame comprises the longitudinal, running or line wires 8 and the mesh forming or picket wires 9. The ends of the line wires 8 pass through the perforations or openings 5 and also through the perforations or openings 6 in the end bars 3 and 4 and the protruding ends of said line wires 8 are headed or riveted, as shown at 10, for the purpose of securing such wires to the gate frame and to prevent longitudinal displacement of such wires, thereby firmly securing the line wires 8 within the confines of the gate frame.

The mesh forming or picket wires 9 are laid across the longitudinal running or line wires 8 and the opposite ends of said mesh forming or picket wires are passed through the perforations or openings 5 and also through the perforations or openings 6 in the top and bottom bars 1 and 2 respectively of said frame and the protruding ends of said mesh forming or picket wires 9 are headed or riveted, as shown at 11, in manner similar to the heading or riveting of the line wires, for the purpose of securing said mesh forming or picket wires to the frame and to prevent longitudinal displacement of such wires, thereby firmly securing the mesh forming wires within the confines of the gate frame.

Reference is had to Fig. 2 which shows considerably enlarged, the form of the head or rivet on the ends of the line wires 8 and the seat for the same in the openings 6 in the end bars 3 and 4. It will be observed upon examination of Fig. 2 that the head 10 is substantially semi-spherical in shape, having the convex surface 12, where the same merges into the wire length. The head or rivet 10 on the ends of the line wires 8 will seat themselves in the cup or concave seat 7 of the opening 6. The foregoing description as applied to the line wires 8 and their heads or rivets, it will be understood may also be applied to the mesh forming or picket wires 9 and their heads or rivets and all such description relating to the relation that the heads or rivets of the line wires 8 have with the end bars 3 and 4, applies equally as well to said mesh forming or picket wires 9.

I have previously called attention to the fact that the perforations or openings 5 are somewhat larger than the perforations or openings 6, and I mean by that, that the perforations or openings 6 are substantially large enough in both the end bars 3 and 4 and the top and bottom bars 1 and 2 to receive respectively, the line wires 8 and the mesh forming or picket wires 9, so that when all such wires are headed, they cannot be drawn through such openings in said bars of the frame; but the perforations or openings 5 are somewhat larger than the perforations or openings 6 and are so provided to give sufficient play to the line and mesh forming or stay wires, if such wires are moved from side to side so that there will be no tendency to break the wires at this point, which otherwise might be the case if the openings 5 were only the approximate size of the line wires.

The movement of the line wires 8 and the mesh forming or picket wires 9, such as that above referred to, is made possible by reason of the heading or riveting of the ends of the wires, and forming a seat for such heads in the opening 6 of the top, bottom and end bars of the frame, whereby a substantial ball and socket joint is produced.

It will thus be seen that if there is any movement of either of the line wires 8 or mesh forming or picket wires 9, it is made possible by the openings 5, and the head of any such wire or wires will rock in the seat provided therefor in the opening 6.

Before the heading or riveting of the ends of the line wires 8 and the mesh forming or picket wires 9, it is preferable to stretch such wires, so that when the heading operation is completed, such wires will be secured taut in the frame. The same result, may be obtained without stretching the wires in other well known ways and I do not wish to confine myself to such stretching operation, as no specific claim is made thereto.

After the line wires and the mesh forming or picket wires have been secured crosswise of each other in the frame, in the manner stated, each mesh forming or picket wire where it crosses or intersects a line wire is secured by a tie wire 13, being preferably in the form of a staple tie, which engages the wires 8 and 9 in a manner to securely hold the same and prevent slipping one upon the other.

The manner in which the line, mesh forming or picket wires are secured to the frame and to each other, insures that not only will they be held taut but that the mesh forming or picket wires will be straight up and down, crossing the line wires, and that sidewise pressure or lateral strain will produce no effect, but on the other hand all such wires following any such sidewise pressure or lateral strain will return, or assume their normal relation and will remain taut in the frame.

What I claim is:—

1. In a gate, the combination of a frame, including top and bottom and end bars each having wire receiving openings; a plurality of line wires, the opposite ends of which pass through the openings in the respective end bars of said frame, the opposite ends of each wire being headed; a plurality of picket wires, said picket wires crossing said line wires, their upper and lower ends passing respectively through the openings in the top and bottom bars of the frame, the opposite ends of said picket wires being headed; and means connecting the picket wires to the line wires where they intersect.

2. In a gate, the combination of a frame, including top and bottom and end bars each having wire receiving openings; a wire mesh secured within said frame, the opposite ends of certain of said wires passing through the openings in the opposite end bars of said frame and being headed, and the opposite ends of certain other of said wires passing respectively through the openings in the top and bottom bars of said frame and being headed.

WILLIAM H. SOMMER.

In the presence of—
CHAS. W. LA PORTE,
EDWIN G. SCHAEFFER.

Copies of this patent may be obtained for five cents each, by addressing the "Commissioner of Patents, Washington, D. C."